Aug. 18, 1953
F. PORTER ET AL
2,649,166
ABSORPTION OF CARBON DIOXIDE FROM
GASES CONTAINING THE SAME
Filed May 2, 1950
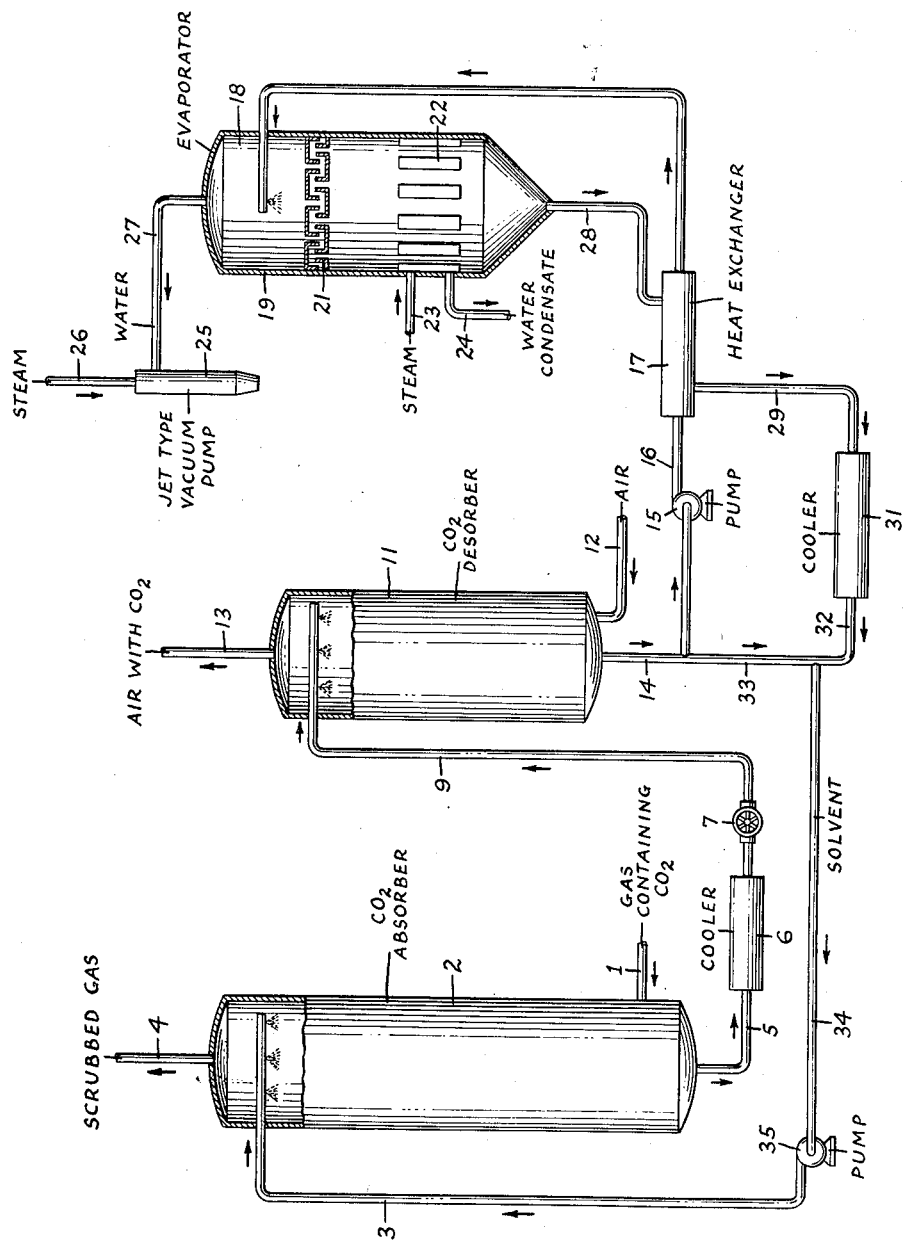
INVENTORS
FRANK PORTER
BY JOHN CLIFFORD ECK
ATTORNEY.

Patented Aug. 18, 1953

2,649,166

UNITED STATES PATENT OFFICE 2,649,166

ABSORPTION OF CARBON DIOXIDE FROM GASES CONTAINING THE SAME

Frank Porter and John C. Eck, Morris Township, Morris County, N. J., assignors to Allied Chemical & Dye Corporation, New York, N. Y., a corporation of New York Application May 2, 1950, Serial No. 159,529

3 Claims. (Cl. 183—115)

1

This invention relates to the absorption of carbon dioxide in liquid solvents and more particularly refers to a new and improved method of removing carbon dioxide from gaseous mixtures containing the same.

In the preparation of gases for synthesis of ammonia whether by partial combustion of hydrocarbons, water gas reaction or the like there is produced a gas mixture containing a high percentage of carbon dioxide which must be removed since gases having an appreciable amount of carbon dioxide cannot be tolerated in the ammonia synthesis. Alkaline solutions may be employed as a reactant to extract carbon dioxide from gas mixtures; however, the preferred commercial method of treating hydrogen-carbon dioxide mixtures is by absorption of the carbon dioxide in water. The relatively low absorption coefficient of water for carbon dioxide (0.88 volume $CO_2$ absorbed at 1 atmosphere at 20° C. in 1 volume water) imposes the requirement of a high ratio of water to gas to effect removal of carbon dioxide with of course large equipment and operating costs. Mere substitution of any solvent having a higher absorption coefficient than water does not suffice since there are many other factors which bear on the suitability of a solvent for absorption of carbon dioxide as for example resistance to oxidation by air, resistance to polymerization, inertness to sulfur compounds, heat of solution, absorption coefficient for hydrogen, vapor pressure, freezing point, and viscosity. Further, a solvent may have physical properties deemed desirable for scrubbing carbon dioxide containing gases but in practical application prove to be a failure under the operating conditions imposed thereby. Thus, it will be evident that successful commercial extraction of carbon dioxide from gases involves the use of a solvent having desired physical properties and particularly a method of operation which will utilize such solvent in an efficient and economical manner.

An object of the present invention is to provide a simple and efficient method for scrubbing carbon dioxide from gases containing the same with a normally liquid, non-reactive organic solvent.

Another object is to provide a continuous method of absorbing carbon dioxide in a normally liquid, non-reactive organic solvent having a higher absorption coefficient for carbon dioxide than water and concomitantly maintaining the absorption coefficient of the solvent near its maximum value.

A further object of the present invention is to provide a normally liquid, non-reactive organic solvent having relatively high absorption coefficient for carbon dioxide as compared to water together with other properties which make it eminently suitable for scrubbing carbon dioxide from gas mixtures.

Other objects and advantages will be apparent from the following description and accompanying drawing.

A satisfactory solvent for the absorption of carbon dioxide should preferably have the following properties:

(a) a fairly high absorption coefficient for carbon dioxide, preferably about four times that of water—too low an absorption coefficient would not warrant its cost;

(b) no salt formation with the carbon dioxide, since then a greater cost than mere degasification would be encountered in recovering the solvent for reuse;

(c) a low absorption coefficient for hydrogen so as not to lose an appreciable quantity of hydrogen;

(d) an inertness to reaction with sulfur compounds so that degasification could be used to recover the solvent;

(e) a low absorption coefficient for oxygen so as not to absorb oxygen during the degasification by means of an air stream and then release oxygen into the product gas during the scrubbing step;

(f) a resistance to oxidation by air so as not to destroy the solvent during the degasification step;

(g) a low vapor pressure in order to secure a minimum loss during absorption and degasification;

(h) a freezing point at or below 0° C. so as not to freeze in cold weather;

(i) a low viscosity even at 0° C. for winter operation;

(j) a resistance to polymerization;

(k) a heat of solution for carbon dioxide not appreciably higher than with water.

Of the various solvents tested we have found that the ethers of polyglycols, which are liquid at normal temperature and pressure, have the requisite properties incorporated in (a) to (k) above. Examples of the ethers of polyglycols are as follows: dimethoxytetraethylene glycol, diethoxytriethylene glycol, dibutoxytriethylene glycol, dibutoxydiethylene glycol, dipropoxytetraethylene glycol, dipropoxytriethylene glycol and dipropoxydiethylene glycol. Such ethers boil within the range of from 200 to 300° C. The preferred solvent is dimethoxytetraethylene glycol $$(CH_3O[CH_2CH_2O]_4CH_3)$$

since it has outstanding properties as compared with water and in addition is available in commercial quantities at a relatively low cost. The table below gives a comparison of the properties of water and dimethoxytetraethylene glycol:

| Physical Properties | Water | Dimethoxytetraethylene Glycol |
|---|---|---|
| Density, $D_{20}^{20}$ | 0.998 | 1.013 |
| Boiling Point in °C. @ 760 mm | 100 | 276 |
| Vapor Pressure in mm. Hg @ 20° C | 17.53 | 0.0021 |
| Viscosity in Cps. @ 20° C | 1.00 | 3.93 |
| $CO_2$ Abs. Coeff.[1] @ 20° C | 0.88 | 4.00 |
| $H_2$ Abs. Coeff.[1] @ 20° C | 0.021 | 0.039 |
| Heat of Solution [2] | 4,755 | 4,920 |

[1] Absorption coefficient for gas in solvent at 20° C.; volume (N. T. P.) of gas absorbed at one atmosphere (total pressure of gas plus solvent) per volume of solvent.
[2] Heat of solution in gram calories for gram mole of carbon dioxide From the table above it will be apparent that dimethoxytetraethylene glycol is far superior to water with respect to its vapor pressure and its absorption coefficient for carbon dioxide. Although the hydrogen absorption coefficient of dimethoxytetraethylene glycol is slightly greater than the comparable figure for water, in practice less hydrogen (the desired product of the process) will be lost when using dimethoxytetraethylene glycol due to its higher $CO_2$ absorption coefficient because less liquid solvent is required to remove the same quantity of carbon dioxide from the gases. The minor difference in heat of solution between dimethoxytetraethylene glycol and water will have a negligible effect on the operation.

In practical tests employing ethers of polyglycols as solvents for scrubbing carbon dioxide from gases we found the $CO_2$ absorption coefficient of the solvent dropped rapidly and to such an extent so as to make the process commercially impractical. After extensive investigation we discovered that moisture was absorbed by the solvent from the gases undergoing treatment and from the air blast employed to degasify the solvent. Small amounts of water exerted an unexpected retarding effect upon the absorption coefficient of the organic solvent. For example, normally one would expect that a blend of 90% dimethoxytetraethylene glycol with 10% water would have an absorption coefficient in proportion to the absorption coefficient exerted by the individual components, i. e. 90% of 4.0=3.6, and 10% of 0.88=0.09 or a combined effect of 3.69. By measurement the absorption coefficient of the blend surprisingly was found to be 2.35. Dimethoxytetraethylene glycol diluted with 5% water has an absorption coefficient of 3.44 and when diluted with 2½% water has an absorption coefficient of 3.78. Our tests have demonstrated the importance and indeed the necessity in commercial operation of maintaining the water content of the liquid organic solvent to as low an amount as practical, preferably below 5%.

In accordance with the present invention removal of carbon dioxide from gases containing the same may be accomplished by passing a gas containing carbon dioxide in intimate contact with a normally liquid polyglycol ether thereby absorbing the carbon dioxide in the polyglycol ether solvent, degasifying the solvent by passing air through the solvent to remove the carbon dioxide dissolved in the solvent, removing water from the solvent in an amount such that the resulting solvent contains less than 5% water, and returning the thus degassed, dewatered solvent for further contact with the gas containing carbon dioxide.

A specific embodiment of the invention comprises passing a hydrogen-carbon dioxide gas mixture countercurrent and in intimate contact with dimethoxytetraethylene glycol in a first zone, withdrawing the dimethoxytetraethylene glycol after contact with the gas from the first zone and passing the dimethoxytetraethylene glycol containing dissolved carbon dioxide into a second zone in contact with a stream of air to effect removal of the carbon dioxide from the dimethoxytetraethylene glycol, withdrawing a portion of the degasified dimethoxytetraethylene glycol from the second zone and evaporating water from said portion in a third zone, commingling the dewatered dimethoxytetraethylene glycol from the third zone with the remaining portion of degasified dimethoxytetraethylene glycol from the second zone and returning the mixture to the first zone for further contact with the hydrogen-carbon dioxide gas mixture, and correlating the relative proportion of degasified dimethoxytetraethylene glycol withdrawn from the second zone for water removal with the amount of water removed therefrom in the third zone so that the mixture of degasified dimethoxytetraethylene glycol from the second zone not subjected to water removal with dewatered dimethoxytetraethylene glycol after water removal from the third zone will contain less than 2½% water.

The accompanying drawing is a diagrammatic flow sheet illustrating one method of practicing the present invention.

Referring to the drawing, hydrogen-carbon dioxide gas mixtures at least partially saturated with water vapor and containing small amounts of other impurities such as hydrogen sulfide and carbon monoxide are introduced at a low temperature and superatmospheric pressure through line 1 into the bottom of absorption tower 2. Although a conventional absorption tower in which liquid is sprayed into the top of the tower and gas introduced near the bottom of the tower passes upwardly countercurrent to the liquid is illustrated, any suitable device for obtaining intimate contact between the gas and the liquid may be employed. More efficient scrubbing of the gases may be obtained by utilizing a plurality of absorption columns connected in series. Superatmospheric pressure is desirably maintained in column 2 since pressure has the effect of increasing the amount of carbon dioxide absorbed by the solvent and increasing the rate at which the carbon dioxide is absorbed. Solubility of carbon dioxide in the solvent decreases with increased temperature. While subatmospheric temperatures will increase the solubility of carbon dioxide in the solvent the maintenance of such low temperatures would require the use of refrigeration which would add considerably to the cost of operation. A further disadvantage in maintaining subatmospheric temperatures would be the increase in viscosity of the solvent. For good commercial practice we have found room temperature (20° C.) in the tower satisfactory.

Solvent at a temperature preferably below 20° C., is introduced into the top of $CO_2$ absorber 2 through line 3 and sprayed downwardly countercurrent to the upwardly rising gas mixture containing $CO_2$. Scrubbed gas is released from the top of the tower 2 through line 4. As a result of the heat solution of carbon dioxide in the solvent the temperature of the solvent is elevated several degrees.

Liquid solvent containing dissolved carbon dioxide at a temperature several degrees above 20° C. is withdrawn from absorber 2 through line 5, cooled to about 20° C. in conventional cooler 6 and reduced in pressure to approximately atmospheric pressure by passing through reducing valve 7. For the sake of economy the energy available due to the reduction in pressure through valve 7 may be utilized, for example to drive a Pelton wheel, which latter may be connected to a dynamo to generate electricity. Also, as a result of reduction in pressure the temperature of the solvent passing through valve 7 drops about 5 to 10° C.

The pressure reduced solvent flows through line 9 into the top of desorber 11, which may be any conventional column such as bubble-cap type tower or packed tower. More rapid and complete degasification occurs at lower pressures. To avoid the use of vacuum pumps we prefer to maintain substantially atmospheric pressure on tower 11. A pool of liquid is desirably allowed to accumulate in the bottom of desorber 11 for the purpose of maintaining a liquid seal therein and to act in the nature of a surge tank to compensate for fluctuations in rate of circulation of liquid solvent. Atmospheric air which of course contains moisture is forced through line 12 into the bottom of column 11 passing upwardly countercurrent to the flow of solvent entering through line 9. This operation is referred to as degasification because the air stream removes carbon dioxide from the solvent in column 11 and carries the carbon dioxide out of the system through line 13. In general an amount of air equal to twice the volume of carbon dioxide dissolved in the solvent should be sufficient to remove substantially all the carbon dioxide in the solvent.

The use of an air stream for accomplishing degasification of the solvent over other methods, as for example heating the solvent to drive off the carbon dioxide, has the advantages of simplicity and economy which includes savings in fuel to heat the solvent and cooling water to reduce the heated solvent to room temperature before entry in the absorption column. Also, avoidance of high temperature minimizes any possibility of deterioration of solvent.

A portion of the degasified solvent withdrawn from the bottom of column 11 through line 14 is forced by pump 15 through line 16, heat exchanger 17 into evaporator 18. In heat exchanger 17 the hot liquid product leaving evaporator 18 passes in indirect contact with degasified solvent thereby cooling the evaporator bottoms and heating the degasified solvent thus effecting a heat economy. The function of evaporator 18 is to vaporize water from the degasified solvent entering therein. A conventional form of evaporator as illustrated in the drawing consists of a shell 19 with one or several bubble-cap type trays 21 and a steam coil or jacket 22 into which steam enters through line 23 and water condensate discharges through line 24. To facilitate removal of water and minimize decomposition and evaporation of the solvent, it is desirable to operate evaporator 18 under subatmospheric pressure. A jet-type vacuum pump 25 may be employed for this purpose with steam entering line 26 as the propelling medium for inducing suction and carrying water vapor from evaporator 18 through line 27. When a vacuum is imposed on evaporator 18 a low temperature of about 100° C. at the bottom of vessel 18 will ordinarily be sufficient to drive moisture from the solvent. Another advantage of maintaining low temperature in evaporator 18 is that low pressure steam, usually a by-product in the plant, will be adequate to vaporize the water from the solvent.

Solvent after removal of water therefrom is withdrawn from the bottom of evaporator 18 through line 28, passing through heat exchanger 17 wherein it gives up a large part of its heat to the incoming solvent, and thence through line 29 into cooler 31 wherein the solvent is further cooled to about room temperature (20° C.). The cooled solvent flows from cooler 31 through line 32 where it commingles with degasified solvent leaving $CO_2$ desorber 11 through lines 14 and 33, and the mixture flowing through line 34 is returned by pump 35, line 3 to the top of $CO_2$ absorber for further scrubbing of the incoming gases.

For best operation the solvent entering the top of absorber 2 should contain no more than 5% water. As a practical matter we have found it desirable to retain a small amount of water, about 2½%, in the circulating body of solvent. In general it is necessary to bleed from $CO_2$ desorber 11 only a small portion of the liquid solvent, i. e. less than 4%, and usually 1 to 2%, of the circulating body of solvent and subject such small portion of liquid solvent to evaporation to remove an amount of water which will balance the water vapor carried into the system by the incoming gases and air and thereby maintain the system in equilibrium with respect to the water content in the circulating body of solvent. Of course the entire body of solvent could be heated to strip it of water but this would entail a large increase in operating and equipment costs and further would subject a larger body of the solvent to higher temperatures with increased solvent losses and possible degradation of solvent. The advantages of bleeding only a relatively small portion of solvent from the system and subjecting it to evaporation are thus apparent.

As previously stated hydrogen-carbon dioxide mixtures commercially employed in the preparation of ammonia synthesis gases contain small amounts of sulfur impurities particularly hydrogen sulfide. Since such sulfur compounds have been known to readily react with organic compounds it was necessary in order to determine the suitability of the ethers of polyglycols as a solvent to ascertain what effect the sulfur compounds would have on the polyglycol ethers. Ethers of polyglycols, specifically dimethoxytetraethylene glycol, were admixed with sulfur compounds and maintained at 100° C. for long periods of time. It was found that the ethers of polyglycols show no significant deterioration as a result of such treatment.

Other tests were conducted with the ethers of polyglycols to determine whether they would oxidize, polymerize, or decompose under the conditions of operation. The polyglycol ethers were found eminently satisfactory in these respects.

The following example illustrates the present invention.

A gas mixture at a temperature of 20° C. and 435 pounds per square inch gauge having the following composition is introduced into the bottom of a packed absorption column at the rate of 130,000 cu. ft. measured at standard conditions per hour:

*Hydrogen-carbon dioxide gas mixture*

| | |
|---|---|
| Hydrogen | 49.45 |
| Carbon dioxide | 29.00 |
| Carbon monoxide | 5.00 |
| Hydrogen sulfide | 0.05 |
| Nitrogen, argon, etc | 16.50 |
| Total | 100.00 |
| Water in gas mixture ounces per 1000 cu. ft. | 0.64 |

Dimethoxytetraethylene glycol containing 2½ by weight water at a temperature of 13° C. is pumped into the top of the absorption tower maintained at a pressure of 435 pounds per square inch gauge at the rate of 18,000 gallons solvent per hour. Scrubbed gases are released from the top of the absorption tower. Liquid solvent containing dissolved carbon dioxide at a temperature of about 22° C. by virtue of the heat of solution of carbon dioxide in the solvent is withdrawn from the bottom of the absorption column, cooled to 20° C. and then reduced in pressure to approximately 15 pounds per square inch gauge. As a result of the reduction in pressure of the liquid solvent the temperature of the mixture of dimethoxytetraethylene glycol and dissolved carbon dioxide is further reduced to about 12.5° C. The low pressure solvent and carbon dioxide mixture passes into the top of a desorber column containing bubble-cap trays maintained at 15 pounds per square inch gauge. A stream of atmospheric air containing 1 pound 9 ounces water per 1000 cu. ft. is blown at the rate of 22,500 cu. ft. per hour measured at standard conditions upwardly through the desorber countercurrent to the flow of solvent containing carbon dioxide. Air and carbon dioxide are released from the top of the desorber column. 270 gallons per hour of degasified solvent from the bottom of the desorber column are withdrawn, preheated to a temperature of 75° and introduced into an evaporator maintained under a vacuum of 60 mm. Hg and at a temperature of 100° C. by means of low pressure steam. Approximately 36 pounds of water per hour, an amount about equal to water added to the system by virtue of the introduction of moisture contained in the gas undergoing treatment and the air employed for degasification, are removed from the top of the evaporator. The dewatered solvent from the evaporator is cooled to about 20° C. and commingled with the remaining portion of degasified solvent from the bottom of the desorber and the mixture then returned to the top of the absorption column for further scrubbing.

During the initial stage of the operation the solvent is permitted to accumulate 2½% by weight of water and thereafter sufficient water is removed from the evaporator to maintain this percentage in the circulating body of solvent.

Although certain preferred embodiments of the invention have been disclosed for purpose of illustration it will be evident that various changes and modifications may be made therein without departing from the scope and spirit of the invention.

We claim:

1. A process for the removal of carbon dioxide from gases containing the same which comprises passing a gas containing carbon dioxide in intimate contact with a normally liquid polyglycol ether selected from the group consisting of dimethoxytetraethylene glycol, diethoxytriethylene glycol, dibutoxytriethylene glycol, dibutoxydiethylene glycol, dipropoxytetraethylene glycol, dipropoxytriethylene glycol and dipropoxydiethylene glycol thereby absorbing the carbon dioxide in the polyglycol ether solvent, passing a stream of air through the polyglycol ether containing dissolved carbon dioxide to effect removal of the carbon dioxide from the solvent, subjecting a minor portion of the degassed solvent to evaporation for removal of water therefrom, commingling the dewatered solvent with degassed solvent not subjected to evaporation for removal of water, returning the mixture of dewatered and degassed solvent for further contact with the gas containing carbon dioxide, and regulating the relative proportion of degassed solvent and dewatered solvent in the mixture so that the solvent mixture will contain less than 5% by volume of water.

2. A process for the removal of carbon dioxide from gases containing the same which comprises passing a gas containing carbon dioxide in intimate contact with dimethoxytetraethylene glycol thereby absorbing the carbon dioxide in the dimethoxytetraethylene glycol solvent, passing a stream of air through the dimethoxytetraethylene glycol containing dissolved carbon dioxide to effect removal of the carbon dioxide from the solvent, subjecting a minor portion of the degassed solvent to evaporation for removal of water therefrom, commingling the dewatered solvent with degassed solvent not subjected to evaporation for removal of water, returning the mixture of dewatered and degassed solvent for further contact with the gas containing carbon dioxide, and regulating the relative proportion of degassed solvent and dewatered solvent in the mixture so that the solvent mixture will contain less than 5% by volume of water.

3. A process for the removal of carbon dioxide from gases containing the same which comprises passing a gas containing carbon dioxide in intimate contact with diethoxytriethylene glycol thereby absorbing the carbon dioxide in the diethoxytriethylene glycol solvent, passing a stream of air through the diethoxytriethylene glycol containing dissolved carbon dioxide to effect removal of the carbon dioxide from the solvent, subjecting a minor portion of the degassed solvent to evaporation for removal of water therefrom, commingling the dewatered solvent with degassed solvent not subjected to evaporation for removal of water, returning the mixture of dewatered and degassed solvent for further contact with the gas containing carbon dioxide, and regulating the relative proportion of degassed solvent and dewatered solvent in the mixture so that the solvent mixture will contain less than 5% by volume of water.

FRANK PORTER.
JOHN C. ECK.

References Cited in the file of this patent

UNITED STATES PATENTS

| Number | Name | Date |
|---|---|---|
| 2,086,731 | Millar et al. | July 13, 1937 |
| 2,139,375 | Millar et al. | Dec. 6, 1938 |
| 2,177,068 | Hutchinson | Oct. 24, 1939 |
| 2,367,695 | Spiselman | Jan. 23, 1945 |
| 2,520,947 | Matuszak | Sept. 5, 1950 |

FOREIGN PATENTS

| Number | Country | Date |
|---|---|---|
| 286,622 | Great Britain | June 5, 1929 |
| 386,052 | Great Britain | Jan. 12, 1933 |
| 400,054 | Great Britain | Oct. 19, 1933 |